(12) United States Patent
Fang et al.

(10) Patent No.: US 9,246,583 B2
(45) Date of Patent: Jan. 26, 2016

(54) METHOD AND APPARATUS FOR MEASURING ROUND TRIP DELAY IN A UNIFIED OPTICAL-COAXIAL NETWORK

(71) Applicant: Futurewei Technologies, Inc., Plano, TX (US)

(72) Inventors: Liming Fang, Cupertino, CA (US); Jim Chen, Corona, CA (US); Li Zhang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 412 days.

(21) Appl. No.: 13/729,768

(22) Filed: Dec. 28, 2012

(65) Prior Publication Data

US 2014/0186025 A1 Jul. 3, 2014

(51) Int. Cl.
*H04B 10/079* (2013.01)
*H04J 3/06* (2006.01)

(52) U.S. Cl.
CPC .......... *H04B 10/0795* (2013.01); *H04J 3/0667* (2013.01)

(58) Field of Classification Search
None
See application file for complete search history.

(56) References Cited

U.S. PATENT DOCUMENTS

| | | | |
|---|---|---|---|
| 2007/0172236 A1* | 7/2007 | Nomura et al. | 398/45 |
| 2009/0296733 A1* | 12/2009 | Yu | 370/458 |
| 2011/0058813 A1* | 3/2011 | Boyd et al. | 398/68 |
| 2011/0320549 A1* | 12/2011 | Ohyama et al. | 709/206 |
| 2012/0163809 A1* | 6/2012 | Sugawa et al. | 398/34 |
| 2012/0236916 A1* | 9/2012 | Kobayashi | 375/224 |
| 2012/0257892 A1* | 10/2012 | Boyd et al. | 398/58 |
| 2013/0202286 A1* | 8/2013 | Boyd et al. | 398/5 |
| 2013/0202304 A1* | 8/2013 | Boyd et al. | 398/98 |
| 2013/0236178 A1* | 9/2013 | Garavaglia et al. | 398/67 |
| 2013/0315593 A1* | 11/2013 | Lamb et al. | 398/66 |
| 2013/0322869 A1* | 12/2013 | Hirth et al. | 398/16 |
| 2013/0343754 A1* | 12/2013 | Shellhammer et al. | 398/43 |

FOREIGN PATENT DOCUMENTS

| | | |
|---|---|---|
| CN | 101170463 A | 4/2008 |
| WO | 2011031831 A1 | 3/2011 |

OTHER PUBLICATIONS

"Broadcom Introduces DOCSIS—Based EoC for EPON Product Portfolio in Support of China's Network Convergence," Press Release; http://www.broadcom.com/press/release.php?id=s523445, Oct. 27, 2010, 2 pages.

(Continued)

*Primary Examiner* — Noel Beharry
*Assistant Examiner* — Nicole E King
(74) *Attorney, Agent, or Firm* — Conley Rose, P.C.; Grant Rodolph; Adam J. Stegge (57) ABSTRACT

A method of determining a round trip delay time in a network comprising receiving a gate message allocating a transmission time window; retrieving a first timestamp from the gate message; setting a first clock to the time corresponding to the first timestamp, and wherein the first clock runs synchronously with a second clock recovered from a received data stream; sending upstream, after a time interval comprising a grant start time included in the transmission time window offset by a random delay time, a registration request message, wherein the registration request message includes a second timestamp obtained from the first clock; and determining a round trip delay (RTT) from a time the registration request message is received and the second timestamp.

10 Claims, 9 Drawing Sheets

(56) References Cited

OTHER PUBLICATIONS

"Operating the EPON Protocol Over Coaxial Distribution Networks Call for Interest," IEEE 802.3 Ethernet Working Group, Nov. 8, 2011, Atlanta, Georgia, 38 pages.

Foreign Communication From A Coutneprart Application, PCT Application No. PCT/CN2013/090751, International Search Report dated Mar. 27, 2014, 6 pages.

Foreign Communication From A Coutneprart Application, PCT Application No. PCT/CN2013/090751, Written Opinion dated Mar. 27, 2014, 3 pages.

"Part 3: Carrier Sense Multiple Access with Collision Detection (CSMA/CD) Access Method and Physical Layer Specifications, Amendment: Media Access Control Parameters, Physical Layers and Management Parameters for Subscriber Access Networks," IEEE Computer Society, IEEE Std 802.3ah, Sep. 7, 2004, 640 pages.

"Part 3: Carrier Sense Multiple Access with Collision Detection (CSMA/CD) Access Method and Physical Layer Specifications, Amendment 1: Physical Layer Specifications and Management Parameters for 10 Gb/s Passive Optical Networks," IEEE Computer Society, IEEE Std 802.3av, 2009, 236 pages.

Hangzhou, "Broadcom Introduces DOCSIS-based EoC for EPON Product Portfolio in Support of China's Network Convergence," Press Release, Oct. 27, 2010, 2 pages.

Stascheit, B., et al., "The Use of Ethernet-Over-Coax in HFC Networks," Scientific Atlanta, A Cisco Company, Transmission Technologies, 2007, 5 pages.

Chen, J., "An Example of Designing a Coax Convergence Layer in EPoC," IEEE, XP002713588, Jun. 22, 2012, 9 pages.

\* cited by examiner

METHOD AND APPARATUS FOR MEASURING ROUND TRIP DELAY IN A UNIFIED OPTICAL-COAXIAL NETWORK

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multi-point (P2MP) network comprised of an optical line terminal (OLT) at the central office, an optical distribution network (ODN), and a plurality of optical network units (ONUs) at the customer premises. Ethernet passive optical network (EPON) is a PON standard developed by the Institute of Electrical and Electronics Engineers (IEEE) and specified in IEEE 802.3ah, which is incorporated herein by reference as if reproduced in its entirety. In EPON, a single fiber can be used for both the upstream and the downstream transmission with different wavelengths. The OLT implements an EPON Media Access Control (MAC) layer for transmission of Ethernet Frames. The Multi-Point Control Protocol (MPCP) performs the bandwidth assignment, bandwidth polling, auto-discovery, and ranging. Ethernet frames are broadcast downstream based on the Logical Link Identifier (LLID) embedded in the preamble of the Ethernet frame. Upstream bandwidth is assigned based on the exchange of Gate and Report messages between an OLT and an ONU.

Ethernet over Coax (EoC) is a generic name used to describe all technologies which can be used for transmission of Ethernet frames over a unified optical-coaxial (coax) network. The name comes from the fact that, except for Data Over Cable Service Interface Specification (DOCSIS), all these technologies have in common that the Ethernet Frames are transmitted in the MAC layer. Different EoC technologies exist, including Multimedia over Coax Alliance (MoCA), G.hn (a common name for a home network technology family of standards developed under the International Telecommunication Union (ITU) and promoted by the HomeGrid Forum), HomePNA Alliance (HPNA), and Home Plug Audio/Visual (A/V), and they have been adapted to run the outdoor coax access from an ONU to an EoC Head End with connected Customer Premises Equipment (CPEs) located in the subscriber homes.

There is a rising demand which requires the use of EPON as an access system to interconnect with multiple coax cables to terminate the Coax Network Units (CNUs) located in the subscriber's home with an Ethernet PON over Coax (EPoC) architecture. However, none of the above-referenced EoC technologies provides a unique way to identify the EoC Head End that connects the EPON and Coax networks. In addition, none of the above-referenced EoC technologies provide a mechanism measuring the round trip delay time in a unified optical-coaxial network. Consequently, there is a need in the art for methods and apparatus to determine the round trip delay time (RTT) including the round trip delays over both the optical and coaxial segments of a unified optical-coaxial network.

SUMMARY

In an embodiment, the disclosure includes a coaxial line terminal (CLT) comprising an optical port configured to couple to an OLT via a PON, an electrical port configured to couple to a CNU via a coax electrical network, a processor coupled to the optical port and electrical port, the processor configured to receive an MPCP Discovery GATE message (GATE) via the optical network, forward the GATE to a network device on the coax electrical network, retrieve a first timestamp from a first MPCP registration request (REGISTER_REQ) message, wherein the first REGISTER_REQ message is received from the network device, and determine a round trip delay time (RTT) from the first timestamp and a time read from a first clock when the first REGISTER_REQ message is received.

In another embodiment, the disclosure includes a method of determining a RTT in a network comprising receiving a GATE message allocating a transmission time window, retrieving a first timestamp from the GATE message, setting a first clock to the time corresponding to the first timestamp, wherein the first clock runs synchronously with a second clock recovered from a received data stream, sending upstream, after a time interval comprising a grant start time included in the transmission time window offset by a random delay time, a REGISTER_REQ message, wherein the REGISTER_REQ message includes a second timestamp comprising a second timestamp obtained from the first clock, and determining a RTT from a time the REGISTER_REQ message is received and the second timestamp.

In yet another embodiment, the disclosure includes an OLT comprising an optical port configured to couple to a PON, and a processor coupled to the optical port, the processor configured to receive an MPCP REGISTER_REQ message, retrieve a timestamp from the REGISTER_REQ message, determine a RTT from the timestamp and a time read from an OLT clock when the REGISTER_REQ message is received, and add a preselected number of delay offsets to the RTT.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, methods, and apparatus to support the unified optical-coaxial network architecture. In one embodiment, this disclosure provides a mechanism for determining a round trip delay time in a network. In another embodiment, the disclosure provides a CLT including optical and electrical ports and a processor coupled thereto to determine a round trip delay time in a network. In yet another embodiment, the disclosure provides an OLT including a processor coupled to an optical port and configured to determine a round trip delay time on a network.

Figure 1:
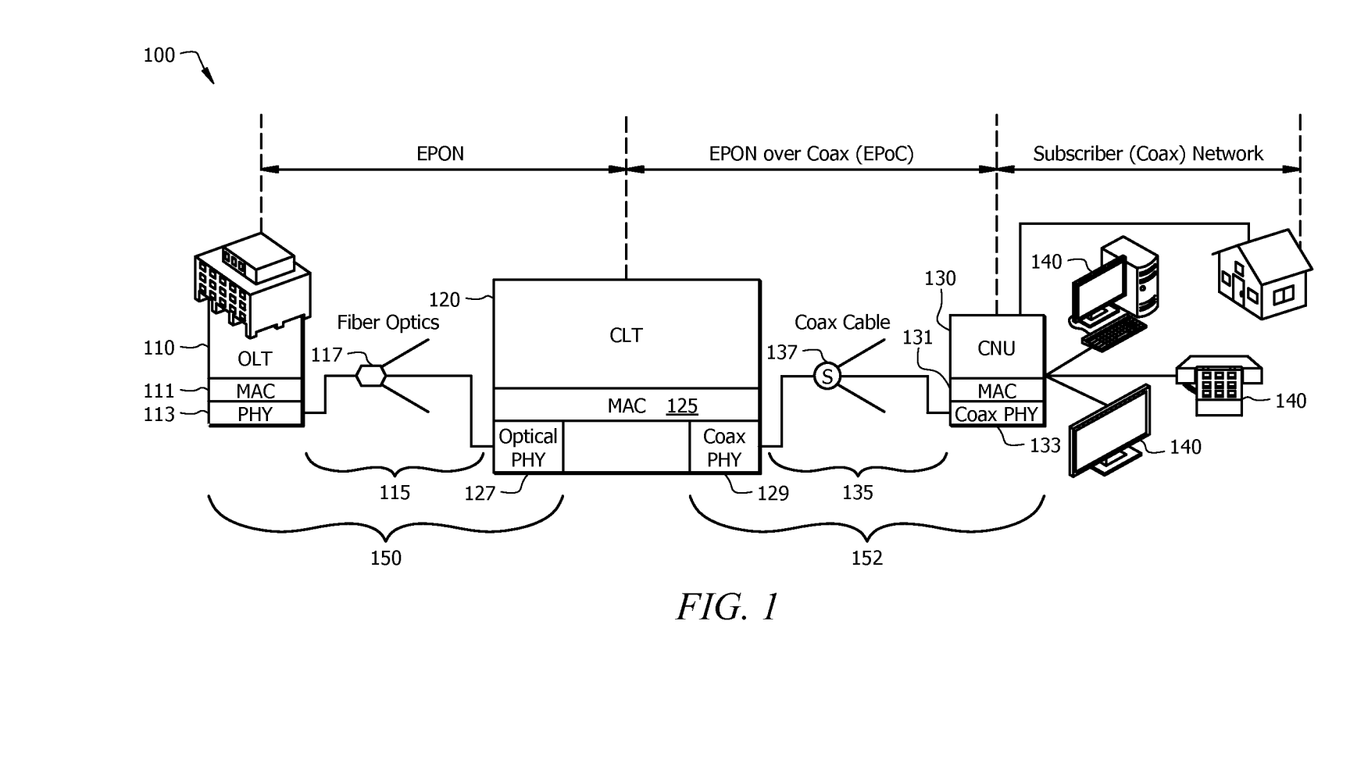
FIG. 1 is a diagram of a unified optical-coaxial network according to an embodiment of the disclosure.

Refer now to FIG. 1, which illustrates an embodiment of a unified optical-coaxial network 100 comprising an optical portion 150 and a coaxial (electrical) portion 152. The unified optical-coaxial network 100 may include an OLT 110, at least one CNU 130 coupled to a plurality of subscriber devices 140, and a CLT 120 positioned between the OLT 110 and the CNU 130, e.g. between the optical portion 150 and the electrical portion 152. The OLT 110 may be coupled via an Optical Distribution Network (ODN) 115 to the CLTs 120, and optionally to one or more ONUs (not shown) in the optical portion 150. The ODN 115 may comprise fiber optics and an optical splitter 117 that couples OLT 110 to the CLT 120 and any ONUs. The CLT 120 may be coupled to the CNUs 130 via an electrical distribution network (EDN) 135, which may comprise a cable splitter 137. Although FIG. 1 shows one CLT 120 and one CNU 130, the unified optical-coaxial network 100 may comprise any number of CLTs 120 and corresponding CNUs 130. The components of unified optical-coaxial network 100 may be arranged as shown in FIG. 1 or any other suitable arrangement.

The optical portion 150 of the unified optical-coaxial network 100 may be similar to a PON in that it may be a communications network that does not require any active components to distribute data between the OLT 110 and the CLT 120. Instead, the optical portion 150 may use the passive optical components in the ODN 115 to distribute data between the OLT 110 and the CLT 120. Examples of suitable protocols that may be implemented in the optical portion 150 include the asynchronous transfer mode PON (APON) and the broadband PON (BPON) defined by the ITU Telecommunication Standardization Sector (ITU-T) G.983 standard, Gigabit PON (GPON) defined by the ITU-T G.984 standard, the EPON defined by the IEEE 802.3ah standard, and the wavelength division multiplexing (WDM) PON (WDM-PON), all of which are incorporated by reference as if reproduced in their entirety.

The OLT 110 may be any device configured to communicate with the CNUs 130 via the CLT 120. The OLT 110 may act as an intermediary between the CLTs 120 or CNUs 130 and another network (not shown). The OLT 110 may forward data received from the other network to the CLTs 120 or CNUs 130 and forward data received from the CLTs 120 or CNUs 130 onto the other network. Although the specific configuration of the OLT 110 may vary depending on the type of optical protocol implemented in the optical portion 150, in an embodiment, the OLT 110 may comprise an optical transmitter and an optical receiver. When the other network is using a network protocol that is different from the protocol used in the optical portion 150, the OLT 110 may comprise a converter that converts the other network protocol into the optical portion 150 protocol. The OLT converter may also convert the optical portion 150 protocol into the other network protocol.

The ODN 115 may be a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the CLT 120. It should be noted that the optical fiber cables may be replaced by any optical transmission media in some embodiments. In some embodiments, the ODN 115 may comprise one or more optical amplifiers. The ODN 115 typically extends from the OLT 110 to the CLT 120 and any optional ONUs (not shown) in a branching configuration as shown in FIG. 1, but may be alternatively configured as determined by a person of ordinary skill in the art.

The CLT 120 may be any device or component configured to forward downstream data from the OLT 110 to the corresponding CNUs 130 and forward upstream data from the CNUs 130 to the OLT 110. The CLT 120 may convert the downstream and upstream data appropriately to transfer the data between the optical portion 150 and the electrical portion 152. The data transferred over the ODN 115 may be transmitted or received in the form of optical signals, and the data transferred over the EDN 135 may be transmitted or received in the form of electrical signals that may have the same or different logical structure as compared with the optical signals. As such, the CLT 120 may encapsulate or frame the data in the optical portion 150 and the electrical portion 152 differently. In an embodiment, the CLT 120 includes a media access control (MAC) layer 125 and physical layers (PHY), corresponding to the type of signals carried over the respective media. The MAC layer 125 may provide addressing and channel access control services to the physical layers. As such, the PHY may comprise an optical PHY 127 and a coaxial PHY 129. In many embodiments, the CLT 120 is transparent to the CNU 130 and OLT 110 in that the frames sent from the OLT 110 to the CNU 130 may be directly addressed to the CNU 130 (e.g. in the destination address), and vice-versa. As such, the CLT 120 intermediates between network portions, namely an optical portion 150 and a coax portion 152 in the example of FIG. 1. As discussed further below, an identifier may be associated with each CLT 120, and the identifier may uniquely identify the each CLT 120.

The electrical portion 152 of the unified electrical and coaxial network 100 may be similar to any known electrical communication system. The electrical portion 152 may not require any active components to distribute data between the CLT 120 and the CNU 130. Instead, the electrical portion 152 may use the passive electrical components in the electrical portion 152 to distribute data between the CLT 120 and the CNUs 130. Alternatively, the electrical portion 152 could use some active components, such as amplifiers. Examples of suitable protocols that may be implemented in the electrical portion 152 include MoCA, G.hn, HPNA, and Home Plug A/V, all of which are incorporated by reference as if reproduced in their entirety.

The EDN 135 may be a data distribution system that may comprise electrical cables (e.g. coaxial cable, twisted wires, etc.), couplers, splitters, distributors, and/or other equipment. In an embodiment, the electrical cables, couplers, splitters, distributors, and/or other equipment are passive electrical components. Specifically, the electrical cables, couplers, splitters, distributors, and/or other equipment may be components that do not require any power to distribute data signals between the CLT 120 and the CNU 130. It should be noted that the electrical cables may be replaced by any electrical transmission media in some embodiments. In some embodiments, the EDN 135 may comprise one or more electrical amplifiers. The EDN 135 typically extends from the CLT 120 to the CNU 130 in a branching configuration as shown in FIG. 1, but may be alternatively configured as determined by a person of ordinary skill in the art.

In an embodiment, the CNUs 130 may be any devices that are configured to communicate with the OLT 110, electrically the CLT 120, and any subscriber devices 140. Specifically, the CNUs 130 may act as an intermediary between the OLT 110 and the subscriber devices 140. For instance, the CNUs 130 may forward data received from the OLT 110 to the subscriber devices 140, and forward data received from the subscriber devices 140 onto the OLT 110. Although the specific configuration of the CNUs 130 may vary depending on the type of unified optical-coaxial network 100, in an embodiment the CNUs 130 may comprise an electrical transmitter configured to send electrical signals to the CLT 120 and an electrical receiver configured to receive electrical signals from the CLT 120. CNU 130 may comprise a coax PHY 133 to connect to EDN 135 and a media access control (MAC) layer 131 may provide addressing and channel access control services to the physical layer, coax PHY 133. Additionally, the CNUs 130 may comprise a converter that converts the electrical signal into electrical signals for the subscriber devices 140, such as signals in the asynchronous transfer mode (ATM) protocol, and a second transmitter and/or receiver that may send and/or receive the electrical signals to the subscriber devices 140. In some embodiments, CNUs 130 and coaxial network terminals (CNTs) are similar, and thus the terms are used interchangeably herein. The CNUs 130 may be typically located at distributed locations, such as the customer premises, but may be located at other locations as well.

The subscriber devices 140 may be any devices configured to interface with a user or a user device. For example, the subscribed devices 140 may include desktop computers, laptop computers, tablets, mobile telephones, residential gateways, televisions, set-top boxes, and similar devices.

Figure 2:
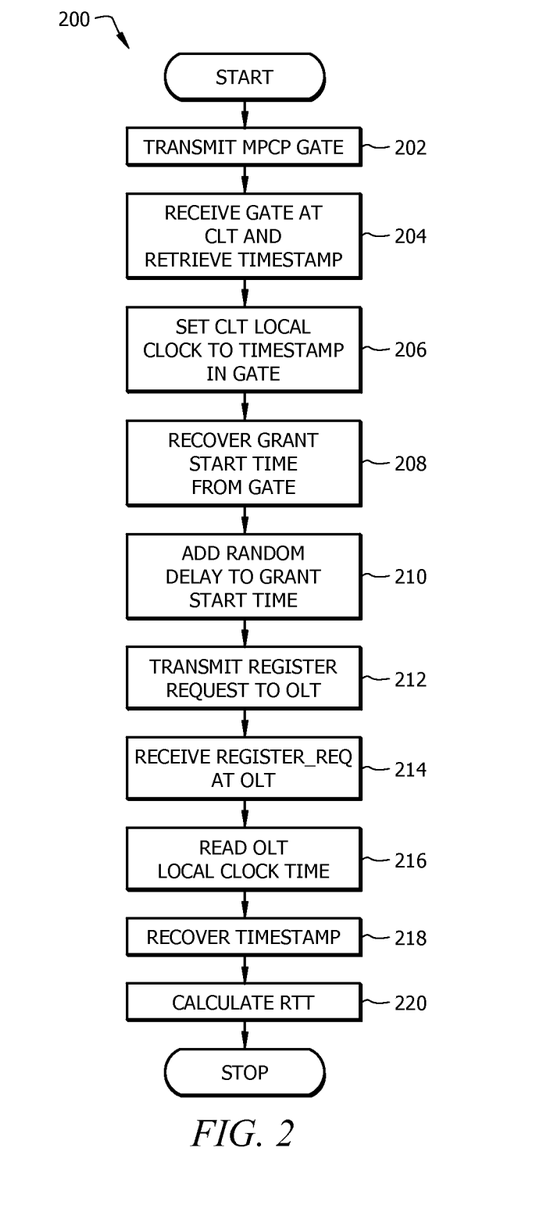
FIG. 2 illustrates a flowchart for a process of measuring a round trip time delay in a network in accordance with an embodiment of the disclosure.

Refer now to FIG. 2, which illustrates a flowchart for a process 200 for determining a RTT in an optical network in accordance with an embodiment of the disclosure. Process 200 may be implemented during, for example, the MPCP discovery process. Process 200 will be described in the context of system 100 shown in FIG. 1; however, it will be understood by those skilled in the art that the principles set forth herein are not limited to the embodiment illustrated in FIG. 1. In step 202 an MPCP Discovery GATE message (GATE) is transmitted by an OLT. On receipt of the GATE at step 204, the CLT recovers the timestamp included in the GATE and sets its local optical domain clock to the timestamp value at step 206. The local optical domain clock may run synchronously with a clock signal recovered from the data stream received in the optical portion, e.g. optical portion 150 in FIG. 1. The relationship between the several hardware clocks and timestamps will be described further in conjunction with FIG. 3 below.

In step 208, a grant start time is recovered from the GATE received in step 204. A random delay is added to the grant start time at step 210, and in step 212 a registration request (REGISTER_REQ) message is sent back to the OLT. The REGISTER_REQ message includes a transmission timestamp as described below in conjunction with FIG. 3. In step 214, the REGISTER_REQ message is received at the OLT, and the OLT reads its MPCP clock time at step 216. In step 218, the timestamp in the REGISTER_REQ message is recovered. In step 220, the RTT is determined as the difference between the OLT MPCP clock, in step 216 and the timestamp included in the REGISTER_REQ message as recovered in step 218.

Figure 3:
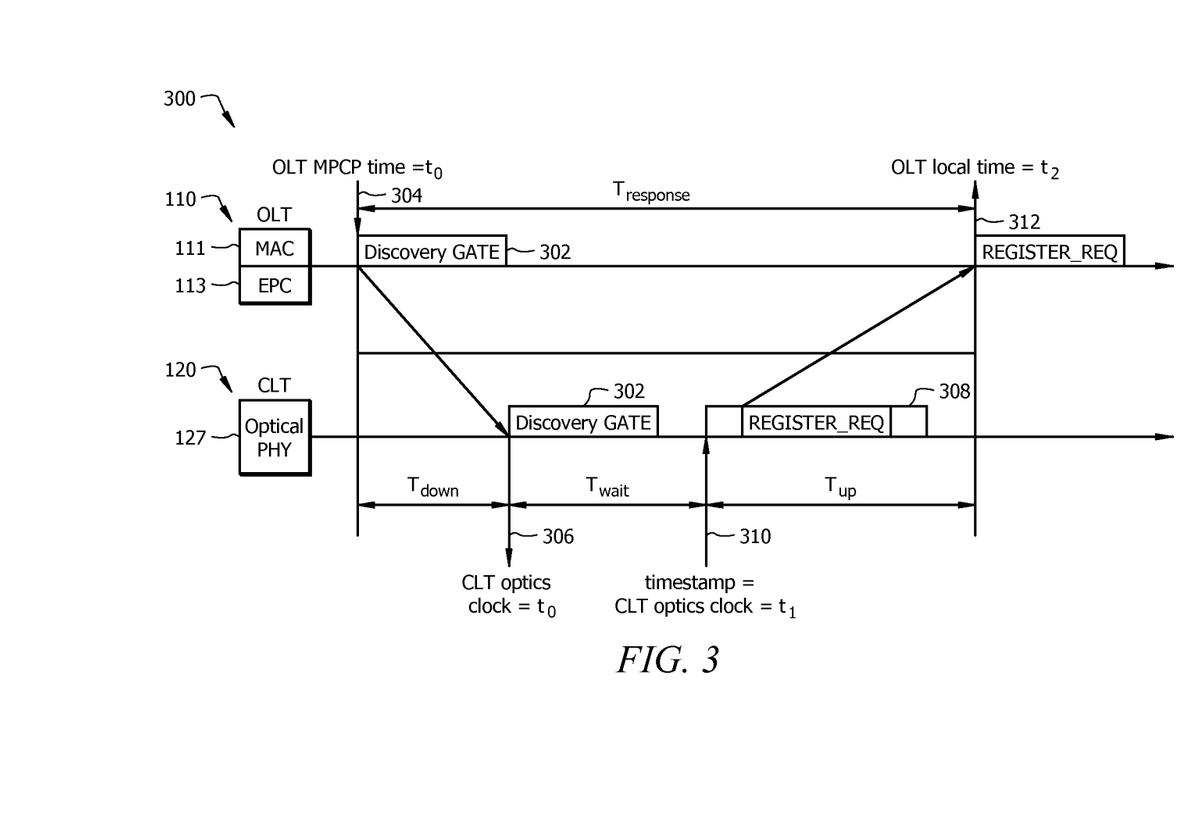
FIG. 3 illustrates a schematic of a message timing diagram in accordance with an embodiment of the disclosure.

Refer now to FIG. 3, which illustrates a message timing diagram 300 that may be used in conjunction with a process for determining a RTT in a network, e.g. process 200 in FIG. 2, in accordance with an embodiment of the disclosure. This process may be implemented during, for example, the MPCP discovery process. An OLT transmits an MPCP Discovery GATE 302 on an ODN to CLT. When the GATE passes through the OLT control multiplexer (not shown), the GATE may be time stamped with the OLT MPCP clock time 304. In the example of FIG. 3, MPCP clock time 304 is depicted as $t_0$. When GATE 302 arrives at CLT (a time interval $T_{down}$ having elapsed), the local optical domain clock time 306 is set to the timestamp value, here $t_0$. After clock time 306 is set, the clock may continue running synchronously with a clock signal recovered from the optical domain data stream.

After a time interval $T_{wait}$ elapses, CLT sends REGISTER_REQ 308 to the OLT. The transmission of REGISTER_REQ 308 may be in accordance with step 212 in FIG. 2. Time interval $T_{wait}$ may be determined by the grant start time included in GATE 302 offset by a random delay introduced by CLT. Thus, time interval $T_{wait}$ may be established in accordance with steps 208 and 210 in FIG. 2.

When REGISTER_REQ 308 passes through the control multiplexer of CLT 120 (not shown), REGISTER_REQ 308 is time stamped with the CLT optical domain clock time 310; in this example denoted $t_1$. REGISTER_REQ 308 arrives at the OLT after an upstream transmission time, denoted $T_{up}$, elapses. Upon receiving REGISTER_REQ 308, the OLT reads its MPCP clock time 312, denoted $t_2$ in this example. The reading of MPCP clock time 312 may be as described in step 216 in FIG. 2. The elapsed time from the sending of GATE 302 by the OLT is denoted $T_{response}$ and has the value $t_2-t_0$ in this example. The RTT comprises $T_{down}+T_{up}$. From timing diagram 300, this is equal to $T_{response}-T_{wait}$, which in this example is given by $t_2-t_1$. Recall that in this example the timestamp in REGISTER_REQ 308 contains $t_1$. Thus, the OLT 110 may determine the RTT by recovering the timestamp and subtracting that value from its MPCP clock time 312, as set forth in steps 218 and 220 in FIG. 2.

Figure 4:
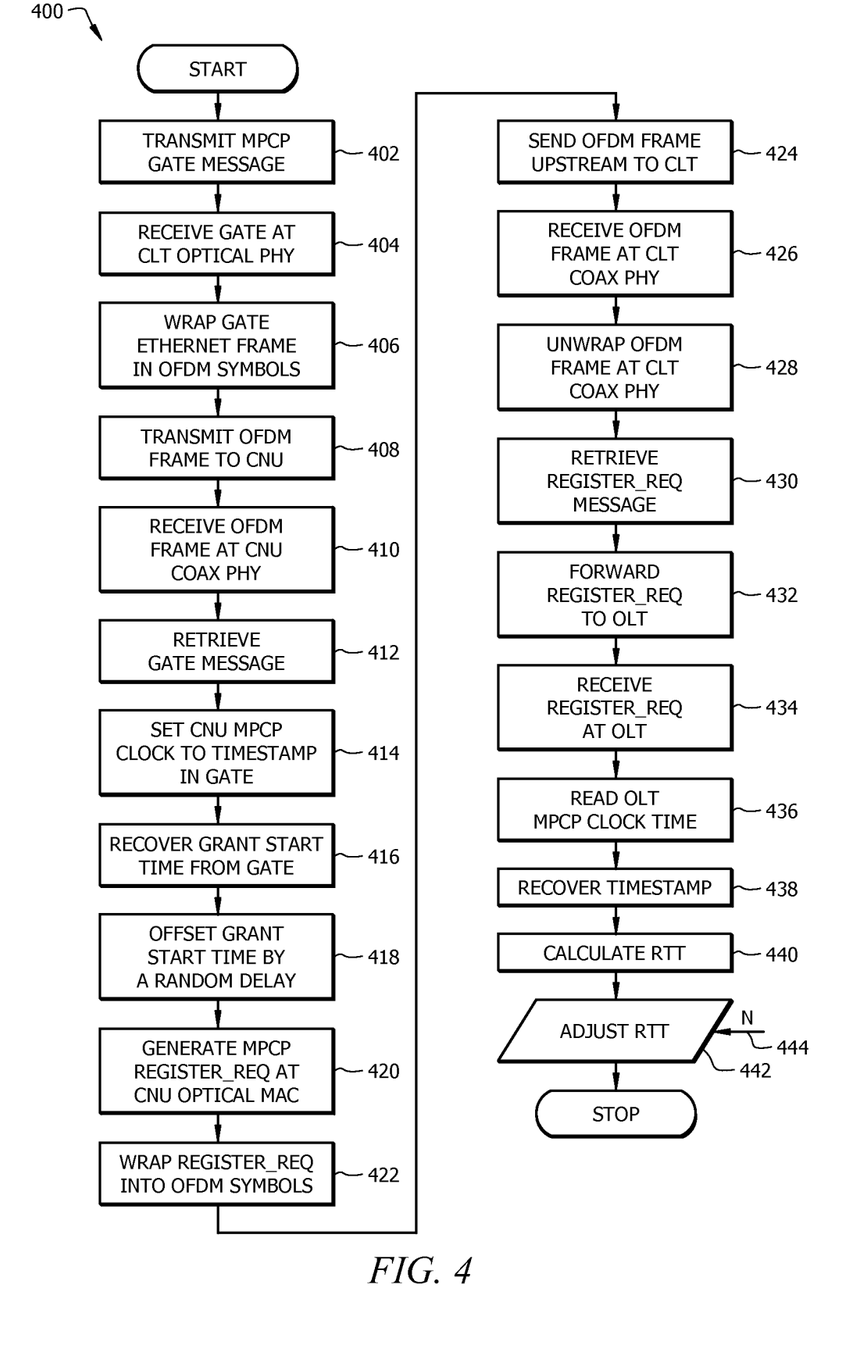
FIG. 4 illustrates a flowchart of a process of measuring a round trip time delay in a network in accordance with another embodiment of the disclosure.

Refer now to FIG. 4, which illustrates a process 400 for determining an RTT on a network in accordance with another embodiment of the disclosure. Process 400 will be described in the context of system 100 shown in FIG. 1; however, it will be understood by those skilled in the art that the principles set forth herein are not limited to the embodiment illustrated therein. In step 402 a GATE is transmitted by the OLT to CLT (the OLT and the CLT are not explicitly shown in FIG. 4). On receipt of the GATE at step 404, the CLT wraps the GATE in one or more orthogonal frequency division multiplex (OFDM) symbols at step 406. The OFDM frame including the symbols is transmitted, in the electrical portion or domain, to the CNU in step 408.

In step 410, the OFDM frame is received at the CNU coaxial PHY, e.g. PHY 129 in FIG. 1. The GATE is retrieved in step 412. The GATE may be retrieved at a CNU MAC layer such as MAC 131 in FIG. 1. The CLT recovers the timestamp included in the GATE and sets its local MPCP clock (not shown) to the timestamp value, step 414. The MPCP clock at the CNU may run synchronously with a clock signal recovered from the data stream. The relationship between the various hardware clocks and timestamps will be described further in conjunction with FIG. 5 below. In step 416, a grant start time is recovered from the GATE retrieved in step 412. The grant start time is offset by a random delay at step 418, and in step 420 a REGISTER_REQ message is generated. The REGISTER_REQ message may be generated at the CNU MAC layer, such as MAC 131 in FIG. 1. The REGISTER_REQ message includes a transmission timestamp as described further in conjunction with FIG. 5.

In step 422, the REGISTER_REQ is wrapped into an OFDM frame for transmission upstream on the coaxial segment of the network, such as electrical domain 152 in FIG. 1. The OFDM frame containing the symbols carrying the REGISTER_REQ message is sent to the CLT for forwarding to the OLT 110 in step 424. In step 426, the OFDM frame carrying the REGISTER_REQ message is received at the coaxial PHY of the CLT. The OFDM frame is unwrapped at step 428, and the REGISTER_REQ message retrieved in step 430. The REGISTER_REQ message may be retrieved at the optical PHY of CLT 120, e.g. optical PHY 127 in FIG. 1. In step 432, the REGISTER_REQ is forwarded to the OLT.

The RTT may be determined as set forth in steps 434-440. In step 434, the REGISTER_REQ is received at OLT 110, and OLT 110 reads its MPCP clock time at step 436. In step 438, the timestamp in the REGISTER_REQ is recovered and in step 440, the RTT is determined as the difference between the OLT 110 MPCP clock and the timestamp included in the REGISTER_REQ message as recovered in step 438. In step 442, the RTT value determined in step 440 may be adjusted by adding a number of symbol delay times to the value from step 440. The number of symbol delays to add may be an input parameter 444, having the value N in this example. A maximum value of N could be any predetermined integer depending on design considerations. A minimum value of N is 0, corresponding to no offset. A representative range of values may be 0 to 10, inclusive. However, it would be understood by those skilled in the art that this range is illustrative and the principles of the disclosure are not limited to such representative values.

Figure 5:
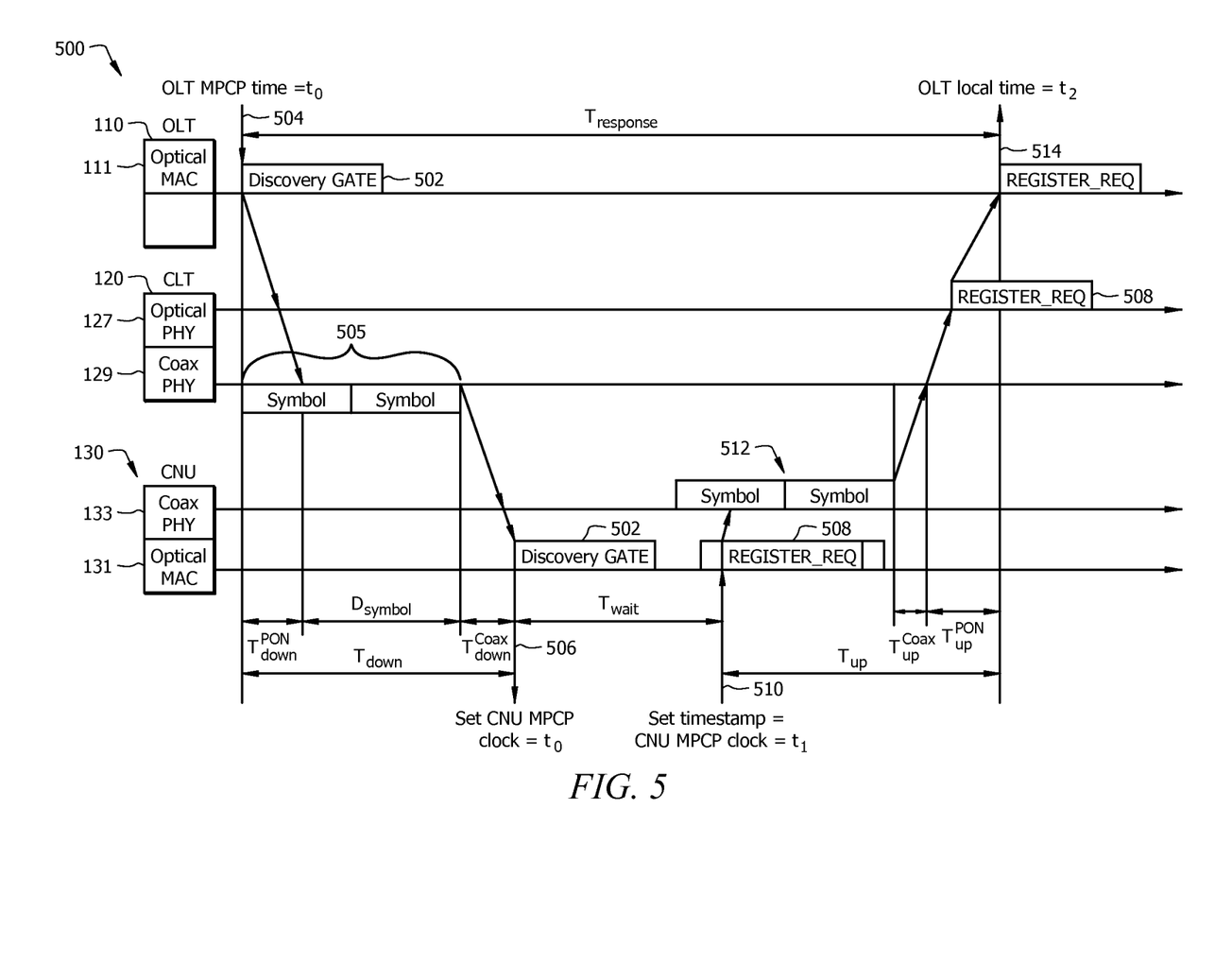
FIG. 5 illustrates a schematic of a message timing diagram in accordance with another embodiment of the disclosure.

Refer now to FIG. 5, which illustrates a message timing diagram 500 which may be used in conjunction with a process for determining a RTT on a network, e.g. process 400 in FIG. 4, in accordance with an embodiment of the disclosure. An OLT 110 transmits a GATE 502 on an ODN 115 (see FIG. 1) to CLT 120. When GATE 502 passes through the OLT 110 control multiplexer (not shown), GATE 502 may be time stamped with the OLT 110 MPCP clock time 504. In the example of FIG. 5, MPCP clock time 504 is denoted $t_0$. GATE 502 arrives at optical PHY 127 of CLT 120 after a time interval $T_{down}^{PON}$ has elapsed, and wrapped into OFDM symbols 505 at coax PHY 129 for transmission on the coaxial segment of the network, e.g. electrical portion 152 in FIG. 1. The receipt of the Ethernet frame comprising GATE 502 and the encoding of the OFDM symbol may be a PHY to PHY process. This may introduce a symbol delay, denoted $D_{symbol}$ in FIG. 5, depending on, for example, the time GATE 502 was sent. Two symbol delays, $T_{symbol}$, are illustrated; however, representative values may be in the range from 1 to 10 symbol lengths, $T_{symbol}$. It would be understood by those skilled in the art that such ranges are illustrative and the principles of the disclosure are not limited to the representative values.

The OFDM frames carrying the message are received at coax PHY 133 (a time interval, $T_{down}^{Coax}$ having elapsed) and GATE 502 is retrieved by MAC layer 131 of CNU 130. This may be in accordance with steps 412 and 414 of process 400 in FIG. 4. Upon retrieving GATE 502, the local optical domain clock time 506 is set to the timestamp value, here $t_0$. After clock time 506 is set, the clock may continue running synchronously with a clock signal recovered from the received data stream. After a time interval $T_{wait}$ elapses, CNU 130 sends REGISTER_REQ 508 to OLT 110. Time interval $T_{wait}$ determined by the grant start time included in GATE 502 plus a random delay introduced by CNU 130. Thus time interval $T_{wait}$ may be established in accordance with steps 416 and 418 in FIG. 4.

When REGISTER_REQ 508 passes through the control multiplexer of CNU 130, REGISTER_REQ 508 is time stamped with the CNU MPCP clock time 510; in this example denoted $t_1$. REGISTER_REQ 508 is wrapped in OFDM symbols 512 at coax PHY 133 for transmission upstream on the coaxial segment of the network and to OLT 110 via CLT 120. This may be performed in steps 422 and 424 in an embodiment in accordance with process 400 in FIG. 4. The OFDM symbols 512 carrying the REGISTER_REQ 508 are received at coax PHY 129, after an interval $T_{up}^{Coax}$ elapses, and REGISTER_REQ 508 is retrieved by optical PHY 127 and forwarded upstream to OLT 110. REGISTER_REQ 508 is then received by OLT 110 (a time interval $T_{up}^{PON}$ having elapsed). Upon receiving REGISTER_REQ 508, OLT 110 reads its MPCP clock time 514, denoted $t_2$ in this example. The reading of MPCP clock time 512 may be performed in accordance with step 436 in FIG. 4.

The elapsed time on the MPCP clock of OLT 110 (not shown) is denoted $T_{response}$ and has the value $t_2-t_0$ in this example. The RTT comprises $T_{down}+T_{up}$. From timing diagram 500, this is equal to $T_{response}-T_{wait}$ which, in this example is given by $t_2-t_1$. Recall that the timestamp in REGISTER_REQ 508 contains $t_1$. Thus, OLT 110 may determine the RTT by recovering the timestamp and subtracting that value from its MPCP clock time 514, corresponding to steps 438 and 440 in FIG. 4. Depending on the time when GATE 502 was issued and when REGISTER_REQ 508 was sent, the unwrapping and wrapping of OFDM symbols may introduce a plurality of symbol delays, $D_{symbol}$, into the RTT determined in this way. In any particular RTT measurement, the number of delays is random. Overestimation of the RTT is not of particular concern; however, an underestimate in some circumstances may give rise to data collision in the upstream channel. Another consequence of underestimation might be that grant start time is reached at the CLT, but the upstream data has not arrived from the CNU. Thus, the RTT as calculated from the difference of $t_2-t_1$ may be adjusted by an additional number of $D_{symbol}$. As described in conjunction with step 442 in FIG. 4, the number of $D_{symbol}$ to add to the calculated RTT may be provided as an input parameter to process 400 in FIG. 4.

The timing relationships may be summarized in the following equations:

$$RTT = T_{down} + T_{up}$$
$$= T_{response} - T_{wait}$$
$$= (t_2 - t_0) - (t_1 - t_0)$$
$$= t_2 - t_1$$
$$= T_{down}^{PON} + T_{up}^{PON} + T_{up}^{Coax} + T_{down}^{Coax} + K \times T_{symbol},$$

$$2 \le K \le 4.$$

The last term, $K \times T_{symbol}$, represents symbol delays introduced by the wrapping and unwrapping of the OFDM symbols described above. The value of K in the range from two to four is by way of example, and, as also described above, representative values may be higher. Those skilled in the art would appreciate that such ranges are illustrative and the principles of the disclosure are not limited to the representative values.

Figure 6:
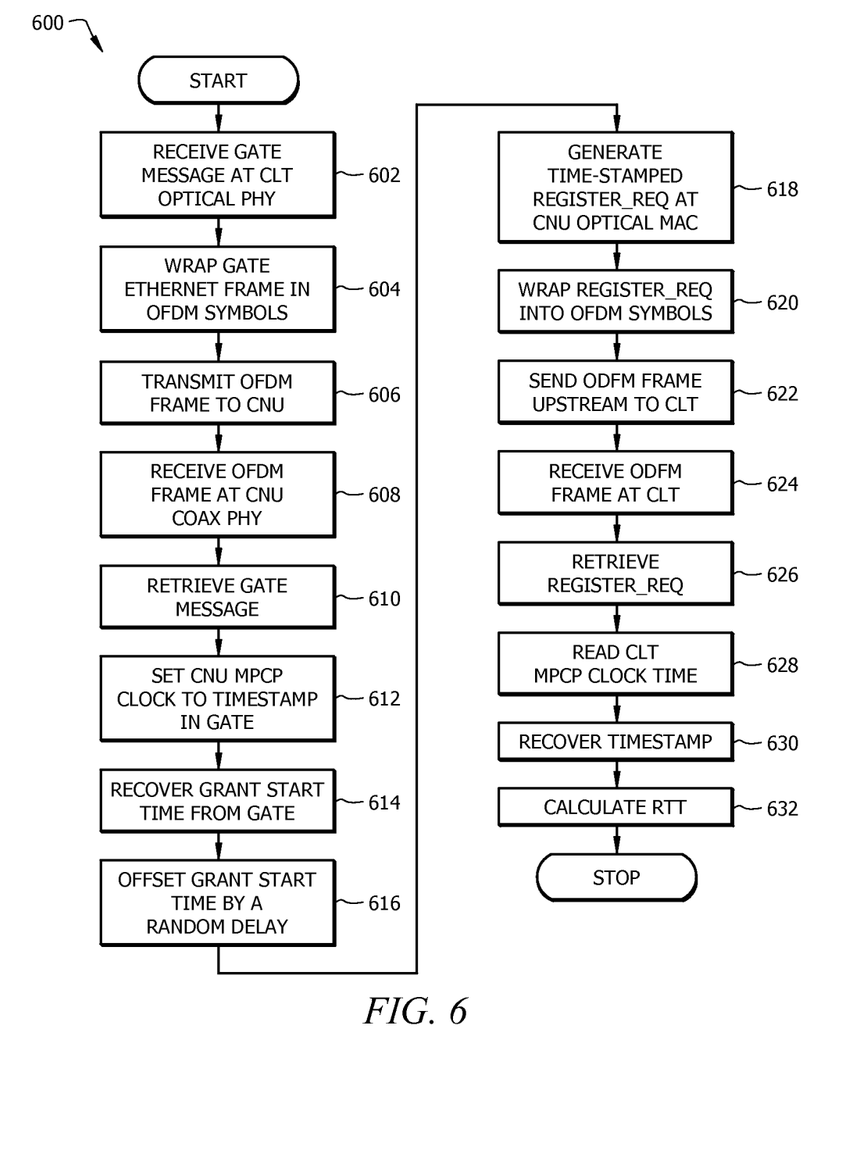
FIG. 6 illustrates a flowchart of a process of measuring a round trip time delay in a network in accordance with another embodiment of the disclosure.

Refer now to FIG. 6, which illustrates a process 600 for determining an RTT on a network in accordance with another embodiment of the disclosure. Process 600 may be implemented during, for example, the MPCP discovery process. Process 600 will be described in the context of system 100 shown in FIG. 1; however, it will be understood by those skilled in the art that the principles set forth herein are not limited to the embodiment illustrated therein. In step 602 a GATE is received by the CLT. In step 604, CLT 120 wraps the GATE in OFDM symbols and transmits an OFDM frame including the symbols, in the coaxial electrical portion, or domain, to the CNU in step 606. In step 608, the OFDM frame is received at the CNU coaxial PHY, e.g. PHY 129 in FIG. 1. The GATE is retrieved in step 610. The GATE may be retrieved at a CNU MAC layer such as MAC 131 in FIG. 1.

The CNU recovers the timestamp included in the GATE and sets its local MPCP clock (not shown) to the timestamp value in step 612. The MPCP clock at the CNU may run synchronously with the clock signal recovered from the data stream. The relationship between the various hardware clocks and timestamps will be described further in conjunction with FIG. 7 below. In step 614, a grant start time is recovered from the GATE retrieved in step 610. The grant start time is offset by a random delay, step 616, and in step 618 a REGISTER_REQ message is generated. The REGISTER_REQ message may be generated at the CNU MPCP MAC layer. The REGISTER_REQ message includes a transmission timestamp, as described further in conjunction with FIG. 7.

In step 620, the REGISTER_REQ is wrapped into OFDM frame symbols for transmission upstream on the coaxial electrical segment of the network, such as electrical portion 152 in FIG. 1. The OFDM frame carrying the REGISTER_REQ message is sent to the CLT in step 622. In step 624, the OFDM frame carrying the REGISTER_REQ message is received at the coaxial PHY of the CLT. The REGISTER_REQ message is retrieved in step 626. The REGISTER_REQ message may be retrieved at the optical PHY of the CLT, e.g. optical PHY 127 in FIG. 1. The MPCP clock time at the CLT is read in step 628. The RTT may be determined as set forth in steps 630 and 632. In step 630, the timestamp in the REGISTER_REQ is recovered. In step 632, the RTT is determined as the difference between MPCP clock time from step 628, and the timestamp included in the REGISTER_REQ message as recovered in step 630.

Figure 7:
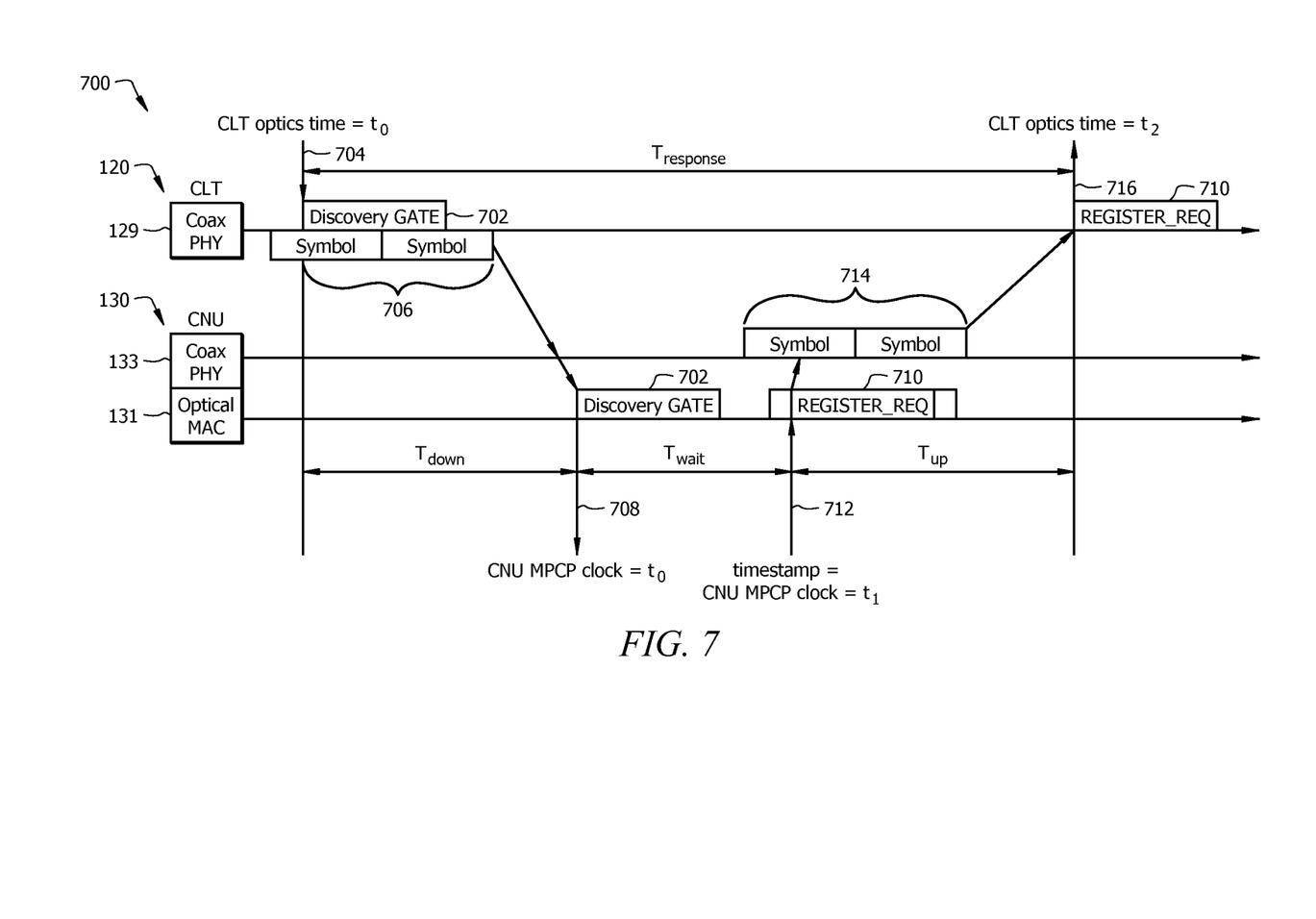
FIG. 7 illustrates a schematic of a message timing diagram in accordance with another embodiment of the disclosure.

Refer now to FIG. 7 which illustrates a message timing diagram 700, which may be used in conjunction with a process for determining a RTT on a network, e.g. process 600 in accordance with an embodiment of the disclosure. A CLT 120 receives an MPCP Discovery GATE message 702 on an ODN, for forwarding to a CNU 130. When the GATE passes through the control multiplexer (not shown) of CLT 120, it is time stamped with the CNU MPCP clock time 704. In the example of FIG. 7, MPCP clock 704 time is depicted as $t_o$. GATE 702 is wrapped into OFDM symbols 706 at coax PHY 129 for transmission on the coaxial segment of the network, e.g. electrical portion 152 in FIG. 1. The OFDM frame carrying GATE 702 is received at coax PHY 133 after a time interval, $T_{down}$ elapses, and GATE 702 is retrieved by MAC layer 131 of CNU 130. This may be in accordance with steps 608 and 610 of process 600. Upon retrieving GATE 702, the local optical portion clock time 708 is set to the timestamp value, here $t_0$. After clock time 708 is set, the clock may continue running synchronously with a clock signal recovered from the received data stream.

After a time interval $T_{wait}$ elapses, CNU 130 sends REGISTER_REQ 710 to CLT 120. Time interval $T_{wait}$ determined by the grant start of the time window included in GATE 702 plus a random delay introduced by CNU 130. Thus, time interval $T_{wait}$ may be established in accordance with steps 614 and 616 in FIG. 6. When REGISTER_REQ 708 passes through the control multiplexer (not shown) of CNU 130, REGISTER_REQ 708 is time stamped with the CNU MPCP clock time 712; in this example denoted $t_1$.

REGISTER_REQ 708 is wrapped in OFDM symbols 714 at coax PHY 133 for transmission upstream on the coaxial segment of the network and to CLT 120. This may be performed in steps 620 and 622 in an embodiment in accordance with process 600 in FIG. 6. The OFDM symbols 714 carrying the REGISTER_REQ 708 are received CLT 120 after an interval $T_{up}$ elapses, and REGISTER_REQ 708 is retrieved therefrom. Upon receiving REGISTER_REQ 708, CLT 120 reads its MPCP clock time 716, the value denoted $t_2$ in this example. The reading of MPCP clock time 716 may correspond to step 628. CLT 120 also recovers the timestamp from REGISTER_REQ 710. CLT 120 may determine the RTT on the coaxial portion of the network, e.g. electrical portion 152 in FIG. 1, by subtracting the recovered timestamp value from its MPCP clock time 716, corresponding to steps 630 and 632.

Figure 8:
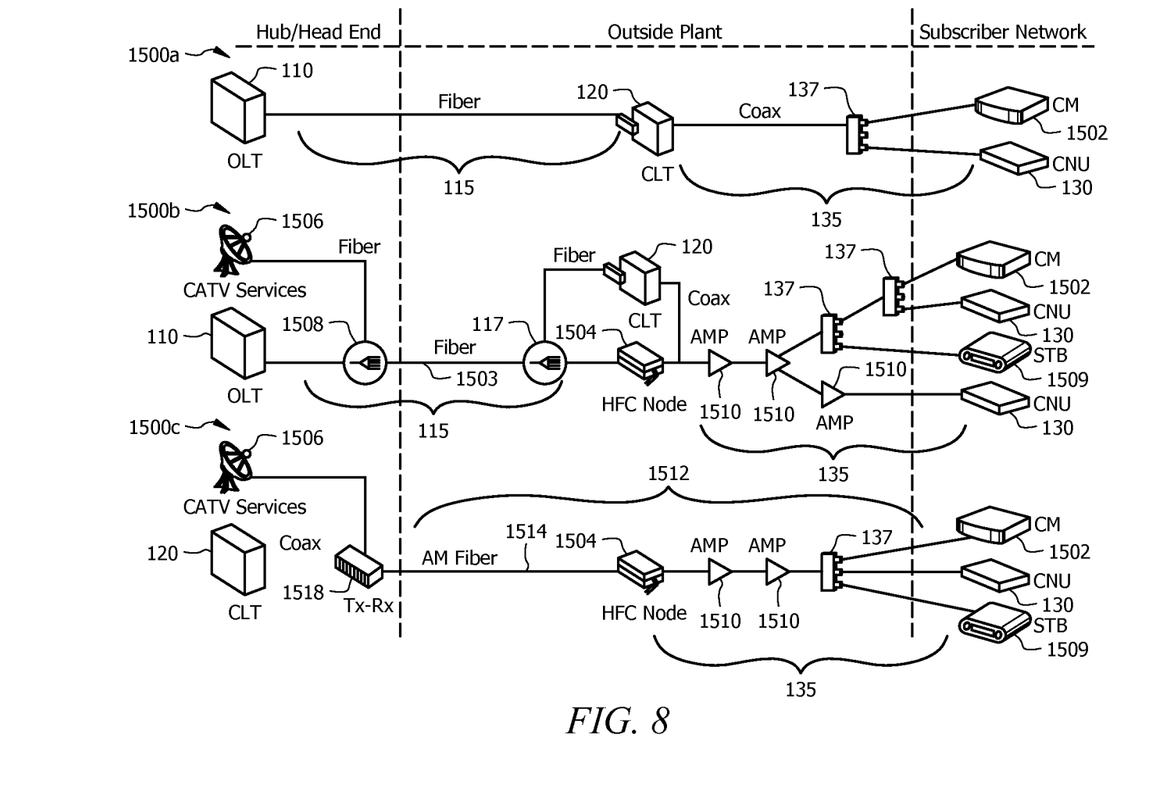
FIG. 8 is a schematic diagram of deployments of a unified optical-coaxial network in accordance with embodiments of the disclosure.

To further appreciate the unified optical-coaxial network 100, refer now to FIG. 8 illustrating unified optical-coaxial networks 1500a, 1500b, and 1500c representing various deployment environments in accordance with embodiments of the disclosure. Unified optical-coaxial network 1500a comprises an OLT 110 which may be located at a hub or head end facility coupled to CLT 120 via ODN 115. Each of OLT 110 and CLT 120 may comprise a processor and other logic (not shown) configured to manage and allocate upstream bandwidth in accordance with embodiments disclosed hereinabove. Further, CLT 120 may, for example, include a processor and other logic (not shown) configured buffer upstream traffic and forward the traffic to OLT 110 during a time window allocated by the OLT 110 as described in conjunction with embodiments disclosed above.

CLT 120 may be coupled to subscriber devices such as cable modem (CM) 1502 and CNU 130. It would be appreciated that subscriber devices CM 1502 and CNU 130 are provided by way of example, and other types of subscriber devices may be connected to CLT 120. As described in conjunction with FIG. 1, CNU 130 also may act as an intermediary between OLT 110 and subscriber devices such as a personal computer, television, set-top box and the like (not shown in FIG. 8). CLT 120 may be coupled to the CNU 130 and CM 1502 via EDN 135 which may comprise splitter 137. In unified optical-coaxial network deployment 1500a, EDN 135 may comprise passive coaxial cables.

Unified optical-coaxial network 1500b may comprise a unified optical-coaxial network deployment through amplifiers in conjunction with cable television (CATV) services 1506. In unified optical-coaxial network 1500b, OLT 110 is coupled to CLT 120 through ODN 115. ODN 115 may carry CATV services 1506 via multiplexer 1508, which multiplexes CATV signals onto fiber 1503. Additionally, multiplexer 1508 may multiplex signals from OLT 110 onto fiber 1503. CATV signals multiplexed onto fiber 1503 may comprise amplitude modulated (AM) analog signals, while signals from OLT 110 multiplexed onto fiber 1503 may comprise digital signals. ODN 115 may include a splitter 117 which may split the digital signals from OLT 110 and analog signals from CATV services 1506 on fiber 1503 and couples these signals to CLT 120 and hybrid fiber-coaxial (HFC) node 1504, respectively. Traditionally, HFC networks have been used to carry CATV services, but it would be appreciated that other services such as high-speed data services and telephony services may also be carried.

EDN 135 may couple signals from CLT 120 and HFC node 1504 to subscriber devices such as CNUs 130, CM 1502, and set-top box (STB) 1509. Again, CNUs 130, CM 1502, and STB 1509 are shown by way of example and it would be appreciated that other types of subscriber devices may be coupled to CLT 120. Electrical signals from CLT 120 and HFC node 1504 may comprise signals in distinct frequency bands and may be combined on EDN 135. For example, electrical signals from CLT 120 may comprise digital signals in a band of about 800 Megahertz (MHz) to about 1 Gigahertz (GHz) and electrical signals from HFC 1504 may comprise analog signals in a band from about 85 MHz to about 750 MHz. However, it would be understood by those skilled in the art that the aforementioned frequency bands are provided by way of illustration and the principles of the disclosure are not limited to these bands.

EDN 135 may further comprise splitters 137 and amplifiers 1510. Amplifiers 1510 may be included in EDN 135 to mitigate against attenuation of electrical signals carried thereon. It would be recognized by those skilled in the art that, in various embodiments, the number of amplifiers 1510 used may be different or an embodiment may not use any amplifiers 1510.

Unified optical-coaxial network 1500c comprises a unified optical-coaxial architecture in which a CLT 120 may be located in a hub/head end facility and digital signals form the CLT 120 overlay an HFC portion 1512 which provides an intermediate optical fiber link, optical fiber 1514. Digital electrical signals from CLT 120 may be amplitude modulated onto an optical signal by optical transceiver 1518. Video signals from CATV services 1506 may also be amplitude modulated onto the optical signal by transceiver 1518 and transmitted to HFC node 1504. HFC node 1504 may convert optical signals received on optical fiber 1514 to electrical signals for transmission via EDN 135 to subscriber devices such as CM 1502, CNU 130, and STB 1509. CM 1502, CNU 130, and STB 1509 as provided in unified optical-coaxial network 1500c are by way of example and not intended to limit the disclosed embodiment to those types of devices, as would be understood by those skilled in the art. Electrical signals output by HFC node 1504 may comprise digital electrical signals arising from the aforementioned digital electrical signals from CLT 120, and analog electrical signals arising from CATV services 1506. As described in conjunction with unified optical-coaxial network 1500b, these respective electrical signals may comprise signals in distinct frequency bands.

Figure 9:
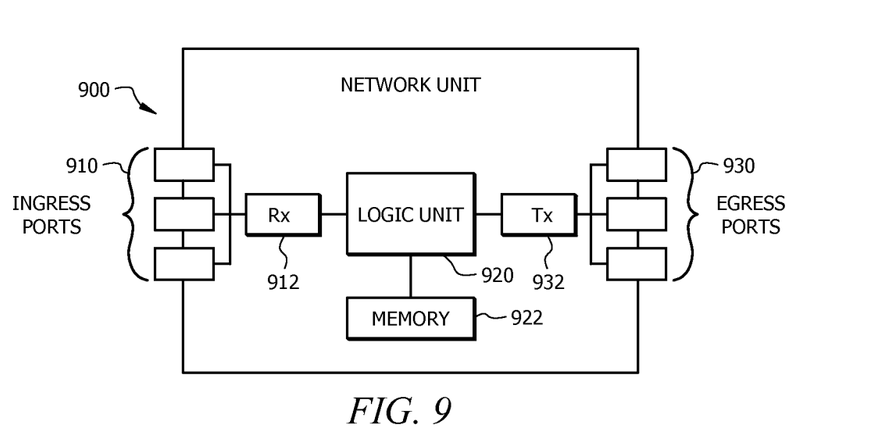
FIG. 9 illustrates in block diagram form an embodiment of a network unit.

At least some of the features/methods described in the disclosure may be implemented in a network apparatus or component, such as a network nodes or units described herein. For instance, the features/methods of the disclosure may be implemented using hardware, firmware, and/or software installed to run on hardware. The network apparatus/component or unit may be any device that transports frames through a network, e.g. an OLT, ONU, etc. FIG. 9 illustrates an embodiment of a transmitter/receiver unit 900, in which the disclosed methods and systems may be implemented. The transmitter/receiver unit 900 may be any device that transports data through the network. The network unit 900 may comprise one or more ingress ports or units 910 coupled to a receiver (Rx) 912 for receiving signals and frames/data from other network components. The network unit 900 may comprise a logic unit 920 to determine to which network components to send data. The logic unit 920 (e.g. MAC logic described above) may be implemented using hardware, software, firmware, or combinations thereof. Specifically, the logic unit 920 may include a processor (which may be referred to as a central processor unit or CPU) that is in communication with memory devices 922, including read only memory (ROM) and/or random access memory (RAM). The logic unit 920 may be implemented as one or more general-purpose CPU chips running software stored in memory 922, or may be part of one or more application specific integrated circuits (ASICs) and/or digital signal processors (DSPs). The network unit 900 may also comprise one or more egress ports or units 930 coupled to a transmitter (Tx) 932 for transmitting signals and frames/data to the other network components. The components of the network unit 900 may be arranged as shown in FIG. 9.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g. k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A coaxial line terminal (CLT) comprising:
   an optical port configured to couple to an optical line terminal (OLT) via a passive optical network (PON);
   an electrical port configured to couple to a coaxial network unit (CNU) via a coax electrical network;
   a processor coupled to the optical port and electrical port, the processor configured to:
   receive a Multi-Point Control Protocol (MPCP) Discovery GATE message (GATE) via the PON;
   forward the GATE to the CNU on the coax electrical network;
   retrieve a first timestamp from a first MPCP registration request (REGISTER_REQ) message, wherein the first REGISTER_REQ message is received from the CNU;
   determine a round trip delay time (RTT) from the first timestamp and a time read from a first clock when the first REGISTER_REQ message is received;
   set the first clock to a time value of a second timestamp in the GATE, wherein the first clock runs synchronously with a second clock recovered from a received data stream;
   retrieve a grant start time from the GATE;
   send a second registration request (REGISTER_REQ) message to the OLT after the first clock reaches the grant start time; and
   timestamp the second REGISTER_REQ message with a time from the first clock, wherein the second REGISTER_REQ message is time stamped when the second REGISTER_REQ message passes through a control multiplexer of the CLT.

2. The CLT of claim 1, wherein the processor is further configured to determine the RTT by subtracting the value of the first timestamp from the time read from the first clock.

3. The CLT of claim 1, wherein the processor is further configured to delay sending the second REGISTER_REQ message after the first clock reaches the grant start time by a random delay time.

4. The CLT of claim 1, wherein the optical port comprises an optical physical layer (PHY) and the electrical port comprises a coaxial PHY, and wherein the optical PHY is configured to receive the GATE and the coaxial PHY is configured to wrap the GATE in at least one orthogonal frequency domain multiplex (OFDM) symbol.

5. A method of determining a round trip delay time in a network comprising:
   receiving, by a coaxial line terminal (CLT), a discovery GATE message (GATE) allocating a transmission time window;
   retrieving, by the CLT, a first timestamp from the GATE;
   setting, by the CLT, a first clock to a time corresponding to the first timestamp, wherein the first clock runs synchronously with a second clock recovered from a received data stream;
   sending upstream, after a time interval comprising a grant start time included in the transmission time window offset by a random delay time, a registration request (REGISTER_REQ) message, wherein the REGISTER_REQ message includes a second timestamp obtained from the first clock, and wherein the REGISTER_REQ message is time stamped when the REGISTER_REQ message passes through a control multiplexer of the CLT; and
   determining a round trip delay time (RTT) from a time the REGISTER_REQ message is received and the second timestamp.

6. The method of claim 5, wherein sending upstream the REGISTER_REQ message comprises:
   sending the REGISTER_REQ message upstream in a coaxial portion of the network, wherein the REGISTER_REQ message is wrapped in one or more orthogonal frequency domain multiplex (OFDM) symbols; and
   forwarding the REGISTER_REQ message upstream in an optical portion of the network.

7. The method of claim 5 further comprising:
   wrapping the GATE in at least one orthogonal frequency division multiplex (OFDM) symbol; and
   forwarding the GATE downstream on a coaxial portion of the network.

8. The method of claim 5, wherein determining the RTT from the time the REGISTER_REQ message is received and the second timestamp comprises subtracting the second timestamp from the time the REGISTER_REQ message is received.

9. The method of claim 8 further comprising adding a preselected number of lengths of one orthogonal frequency division multiplex (OFDM) symbol to the RTT.

10. The method of claim 9, wherein the preselected number of lengths is in the range 0 to 10.

* * * * *

UNITED STATES PATENT AND TRADEMARK OFFICE
CERTIFICATE OF CORRECTION

PATENT NO.         : 9,246,583 B2
APPLICATION NO.    : 13/729768
DATED              : January 26, 2016
INVENTOR(S)        : Liming Fang, Jim Chen and Li Zhang It is certified that error appears in the above-identified patent and that said Letters Patent is hereby corrected as shown below:

Page 2, References Cited, Other Publications Column 1, lines 4 and 7, should read:

Foreign Communication From A Counterpart Application, PCT Application No. PCT/CN2013/090751, International Search Report dated March 27, 2014, 6 pages.

Foreign Communication From A Counterpart Application, PCT Application No. PCT/CN2013/090751, Written Opinion dated March 27, 2014, 3 pages.

Signed and Sealed this
Ninth Day of August, 2016

Michelle K. Lee
*Director of the United States Patent and Trademark Office*